(12) United States Patent
Krasikov

(10) Patent No.: US 7,966,908 B2
(45) Date of Patent: Jun. 28, 2011

(54) SELF-BLOCKING DIFFERENTIAL FOR A TRANSPORTATION MEANS

(75) Inventor: Valeriy Nikolayevich Krasikov, Chelyabinsk (RU)

(73) Assignee: Alexander Veniaminovich Khlabystin, Chelyabinsk (RU)

( * ) Notice: Subject to any disclaimer, the term of this patent is extended or adjusted under 35 U.S.C. 154(b) by 510 days.

(21) Appl. No.: 12/084,864

(22) PCT Filed: Nov. 13, 2006

(86) PCT No.: PCT/RU2006/000591
§ 371 (c)(1),
(2), (4) Date: May 12, 2008

(87) PCT Pub. No.: WO2007/064245
PCT Pub. Date: Jun. 7, 2007

(65) Prior Publication Data
US 2009/0100967 A1 Apr. 23, 2009

(30) Foreign Application Priority Data
Nov. 30, 2005 (RU) .................. 2005137272

(51) Int. Cl.
*F16H 48/12* (2006.01)
(52) U.S. Cl. .......................... 74/650; 74/724
(58) Field of Classification Search .............. 74/665 R, 74/665 GB, 724; 475/332, 333, 348
See application file for complete search history.

(56) References Cited

U.S. PATENT DOCUMENTS

| 4,074,585 | A | * | 2/1978 | Richaud et al. | ............ 74/424.87 |
| 5,311,788 | A | * | 5/1994 | Kasuga | .................. 74/89.33 |
| 5,501,118 | A | * | 3/1996 | Benton | ....................... 74/441 |
| 6,780,133 | B2 | * | 8/2004 | Ohta | ......................... 475/184 |

FOREIGN PATENT DOCUMENTS

| FR | 2723161 | 2/1996 |
| JP | 52043067 | 4/1977 |
| JP | 9184562 | 7/1997 |

* cited by examiner

*Primary Examiner* — Justin Holmes
(74) *Attorney, Agent, or Firm* — Aleksandr Smushkovich

(57) ABSTRACT

The invention relates to the automobile industry, is usable in transportation means differential drives capable of automatically blocking the wheels, and aimed at simplifying the self-blocking differential's design, reducing dimensions, easing the manufacturing, increasing the differential's strength and efficiency. The differential comprises a drive housing, provided with half-axial elements, arranged therein coaxially to each other, whose external surfaces are provided with helical grooves of an opposite spiral direction, rolling members in the form of balls fill in a chain manner at least one closed-loop channel arranged in the housing, and a part thereof made open for insertion of segments of the balls into the grooves. According to the invention, the longitudinal section of the channel is made of a rectangular longitudinal cross-section with rounded external corners, the transversal cross-section of branches of the channel is equal to the ball's diameter and the number of balls in the channel is odd.

1 Claim, 3 Drawing Sheets

SELF-BLOCKING DIFFERENTIAL FOR A TRANSPORTATION MEANS

CROSS-REFERENCE TO RELATED APPLICATIONS

This application is a U.S. national phase application of a PCT application PCT/RU2006/000591 filed on 7 Jun. 2007, published as WO2007/064245, whose disclosure is incorporated herein in its entirety by reference, which PCT application claims priority of a Russian patent application RU2005/137272 filed on 30 Nov. 2005.

FIELD OF THE INVENTION

The invention relates to the automotive industry and can be utilized in differential drives of transportation means designed with a feature of automatic blocking the wheels.

BACKGROUND OF THE INVENTION

There is known a self-blocking differential of a transportation means, chosen by applicant as the prior art prototype, comprising a drive housing in which half-axial elements associated with half-axes are disposed coaxially to each other, and whose external surfaces are provided with helical grooves of opposite spiral directions; rolling members in the form of balls filling in a chain manner at least one closed-loop channel arranged in the housing. A portion of the closed-loop channel, forming an active branch, made open for insertion of segments of the balls into the helical grooves of the half-axial elements. The active branch is joined with a reverse longitudinal branch of the channel by means of lateral toroid-shaped sections of the channel. Besides, the reverse branch of the channel is also performed toroid-shaped with a width greater than one and less than two diameters of the balls (see the description of inventor certificate SU1507603 as of 7.11.87 published 15.09.89, B60K17/20, B.-O.A.Luci).

The mentioned prior art prototype should be considered to have a complicated design, related to the toroid-like shape of the channel. The balls are positioned in one row in the active branch of the channel. The reverse branch, having an essentially greater cross-section size (the width greater than one and less than two diameters of the balls) to place the balls therein in a checker order, combined with the toroid-like shape, complicates manufacturing the whole toroid-like channel, and substantially increases the differential's size.

Additionally, the shape of the closed-loop channel excludes an effective self-braking of the chain of the balls necessary for a full blockage of the automatic differential during a skidding of the transportation means. The self-braking means a force resisting to a displacement of the balls chain in the closed-loop channel. In the channel, having smooth toroid-like bends, the braking forces are very weak. Hence, to increase the forces of self-braking of the chain of the balls during their movement, the author of the prior art prototype needed to increase the diameter of the reverse channel. In such a channel, whose diameter is greater than one, but less than two ball diameters, the rolling members are placed in the checker order. During the movement of the chain of balls, they are burst (wedged) out aside, and a friction force developed between them and the channel's walls increases. Such design of a differential is characterized with low efficiency of the self-blocking device, and operation limitations thereof at low speeds, since self-blocking is basically carried out during acceleration of the transportation means.

In the prior art prototype (inventor certificate SU No 1507603, last paragraph of the description), it says: " . . . forces, transmitted by the balls from one half-axial pinion (half-axial element) to the other, decrease on the portion of infinite channel, having any constructively chosen curvature and width of the channel depending on a necessary coefficient of blocking; while during the engine braking and backing up the self-blocking is less and practically depends on the efficiency of force transmission from one half-axial pinion to the balls, and on the efficiency of force transmission from the balls to the half-axial pinion." Also, the re-position of the balls during the movement of the transportation means from a checker order to a single row requires a high precision of manufacturing of the whole closed-loop channel, increases the number of the balls and the dimensions of the entire device, and reduces its strength.

The technological aims of the claimed solution are: a simplification of design, reduction of the dimensions, and enhancing the technological performance, strength, and efficiency of self-blocking.

BRIEF SUMMARY OF THE INVENTION

The aforementioned aims are achieved due to the following: in the known self-blocking differential of a transportation means, comprising a drive housing, in which half-axial elements, associated with half-axes, are disposed coaxially to each other, and whose external surfaces are provided with helical grooves of opposite spiral directions; rolling members in the form of balls filling in a chain manner at least one closed-loop channel arranged in the housing, a portion of the channel made open for insertion of segments of the balls into the helical grooves, wherein, according to the invention, the closed-loop channel made of a rectangular longitudinal cross-section with rounded external corners, the transversal cross-section of branches of the closed-loop channel is equal to the ball's diameter and the number of balls in the channel is odd.

Accomplishing the closed-loop channel with the rectangular longitudinal cross-section and with rounded external corners allows simplifying the design of the differential, makes it technologically more convenient for manufacturing since it provides for joining the active and reverse branches of the channel with straight-linear sections of an equal diameter at the right angle, while rounding only the external corners of the right rectangle being thus formed. The proposed solution allows bringing the straight-linear reverse section and the active section of the channel maximally closely to each other. Substitution of the channel's wide branch having the checker order of balls distribution and connecting toroid-like parts with a variable cross-section for perpendicular straight-linear sections makes the closed-loop channel much more compact, and allows to significantly reduce the number of balls in the chain. The dimensions of the proposed self-blocking device do not exceed the dimensions of a standard traditional differential, used at present. This solves the problem of mounting the differential in an automobile through a mire exchange of the standard non-blocking differential with an automatic blocking device.

The rectangular channel allows providing more efficient self-braking of the balls chain due to the movement of the balls through the right-angle corners of the closed-loop channel. This permits making the automatic differential with the maximal efficiency of blocking (close to 100%) and maximal efficiency of differencing, since there is no changing load (i.e. no wedging out) from the balls onto the sidewalls of the channel's branches, which increases the overall efficiency of the system. In the unfavorable road conditions, the blocking coefficient becomes optimal during the forward and backward movement. The differential operates automatically during any speed of the automobile. Herein, the processes of blocking and differencing of the device don't interfere with each other, since the feedback from the road, the transportation means is moving upon, to the device is improved. The handling and safety of driving are also enhanced. This makes the automobile stable and drivable on any rough roads. However, during the braking by engine, the self-blocking property of the device improves safety of braking of the transportation means.

The differential has an essential strength due to the maximal efficiency of blocking, inhibiting the balls during any skidding of the transportation means to displace along the channel, thereby excluding an intensive heating and wearing out of the mechanism.

Patent researches, that have been conducted, haven't reveal similar technological solutions, that allows making a conclusion about novelty and the inventive step of the claimed technological solution.

The domestic industry possesses all means (materials, equipment, and technology) necessary for manufacturing the claimed differential and broad utilization thereof in transportation means.

DESCRIPTION OF THE DRAWINGS

The substance of the invention is illustrated in the drawings, whereon.

DESCRIPTION OF A PREFERRED EMBODIMENT OF THE INVENTION

Figure 1:
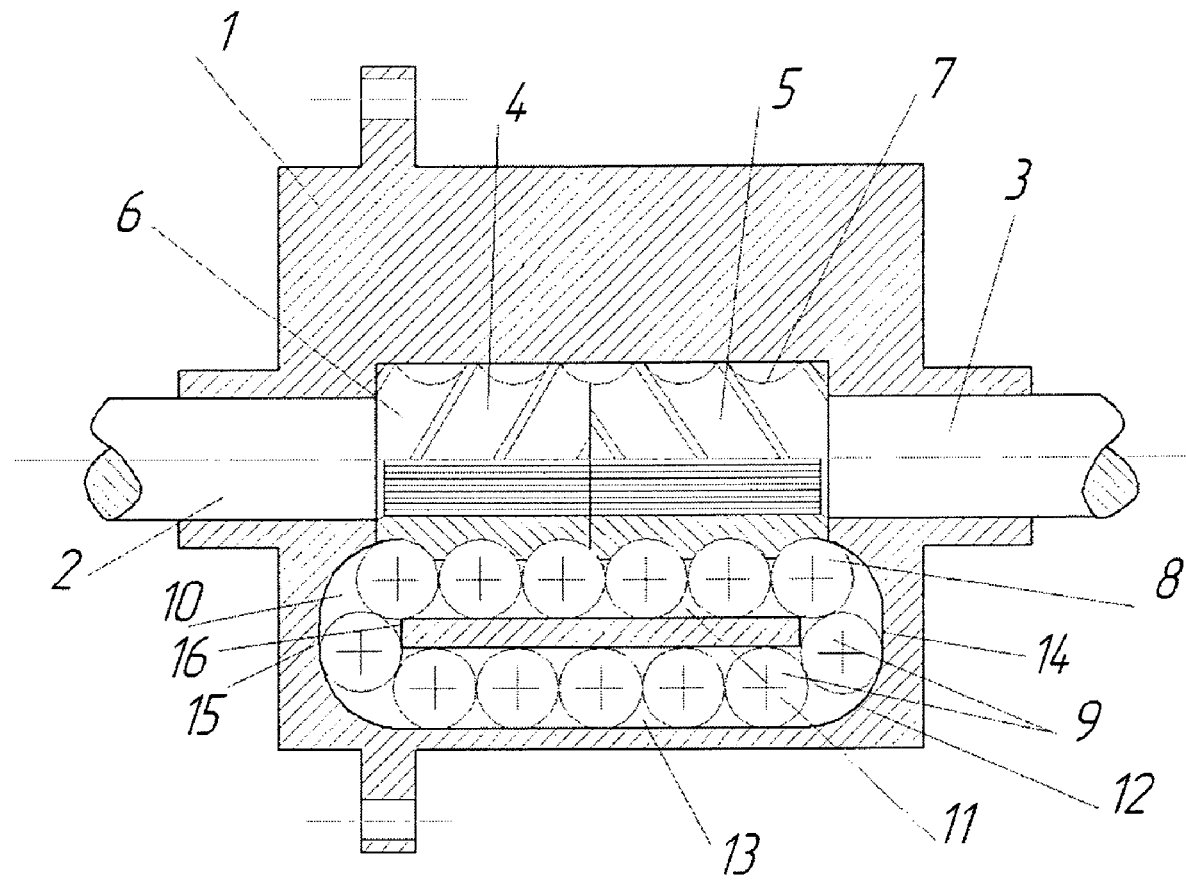
FIG. 1—self-blocking differential shown in a longitudinal cross-section.

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

The self-blocking differential of a transportation means comprises: a drive housing 1, in which half-axial elements 4 and 5, disposed coaxially to each other, associated with half-axes 2 and 3, and provided with helical grooves 6 and 7 of opposite spiral directions; rolling members in the form of balls 8 filling in by a chain 9 at least one closed-loop channel 10 arranged in the housing 1. A portion of the channel 10 (active branch 11) made open for insertion of segments of the balls 8 of the chain 9 into the helical grooves 6 and 7 of the half-axial elements 4 and 5.

Figure 2:
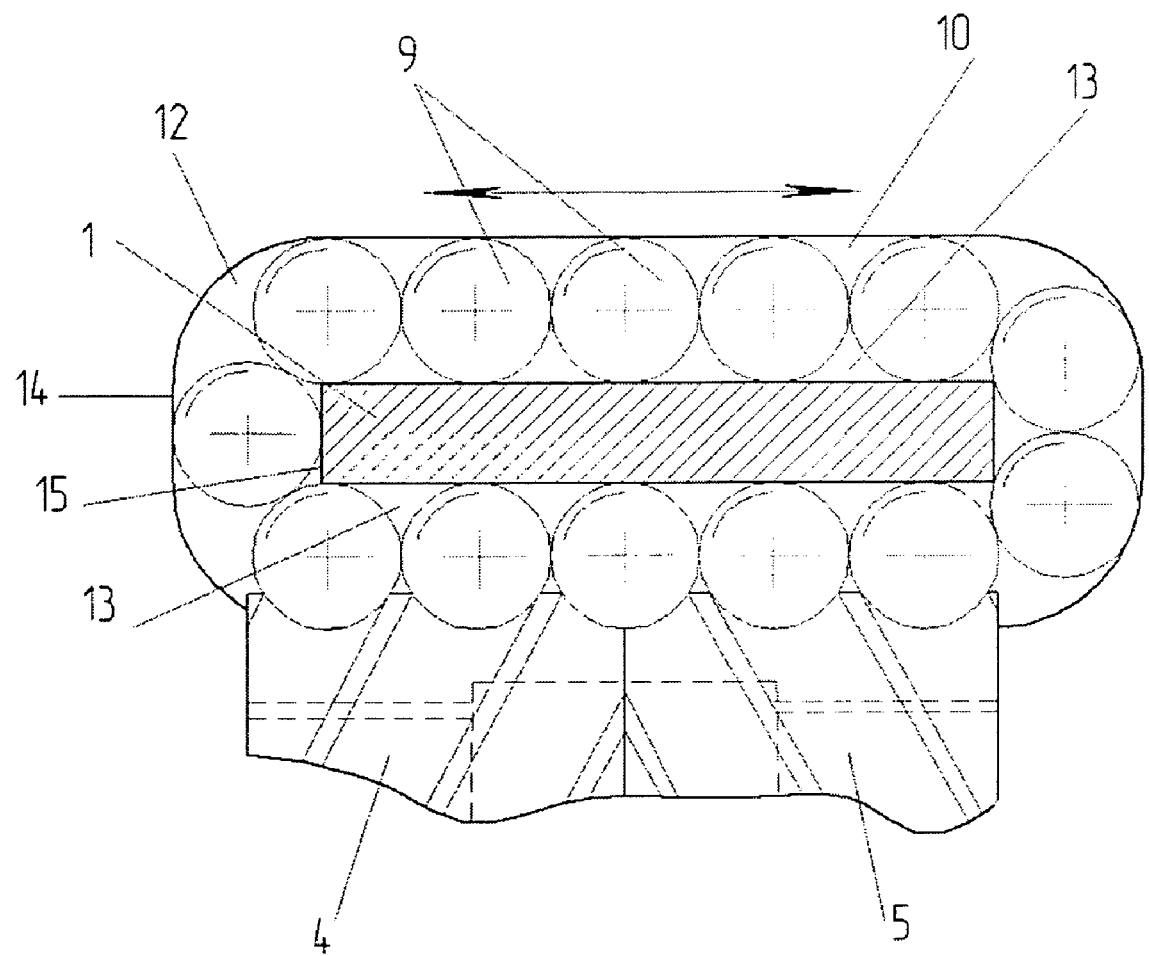
FIG. 2—closed-loop chain consisting of an odd number of balls, placed in a rectangular closed-loop channel of the differential.

The closed-loop channel 10 is made of a rectangular longitudinal cross-section with rounded external corners 12. The active branch 11 and reverse branch 13 of the channel 10 are joined by straight-linear branches 14 and 15 at a right angle, while only the external corners 12 of the so formed rectilinear rectangle are made rounded. The cross-section of all branches of the closed-loop channel 10 is equal to the diameter of balls 8, while the number of balls in the channel 10 is odd. The closed-loop channel 10 is disposed in a tangential (see the description of inventor certificate SU1507603, FIG. 2), or in a radial cross-section of the drive housing 1. The housing 1 of the device may contain more than one rectangular closed-loop channels. The active 11 and reverse 13 branches of channel 10 can be disposed flush with each other. The cross-section of branches of the channel 10 can have any geometrical profile, wherein the diameter of ball 8 is fitting into: a circle, polygon, triangle, etc. The helical grooves 6 and 7 on the surface of the half-axial elements 4 and 5 can also have any geometrical profile, wherein a segment of ball 8 is fitting into: a circle, polygon, triangle, etc. The chains of balls in the channel 10 can be independent (not related) on each other, or united into one common closed-loop chain for any number of rectangular channels (as in Russian Federation Useful Model Patent No. 38871, FIGS. 3, 4). It can be noted, that the even number of rectangular channels 10 in the drive housing 1 with an odd number of balls 8 in each channel 10 makes the total number of balls in the differential even.

The differential operates as follows: Where the transportation means straight-linearly moves on a good road, rotation from the leading housing 1, via the balls 8, being in contact with the helical grooves 6 and 7 of the half-axial elements 4 and 5, is transmitted to the half-axes 2 and 3 of the automobile, and further to the driving wheels, providing to them an equal angular speed. During a turn, or where one of the driving wheels meets an irregularity of the road (a puddle or a ridge), the wheels, and therefore the half-axes 2 and 3 with the half-axial elements 4 and 5, tend to rotate with different angular speeds. This cause the balls 8 to displace along the rectangular channel 10 not impeding the turn of the transportation means. When one of the driving wheels meets a slippery spot on the road, its engagement with the road sharply decreases. The balls 8 in the device are wedged out by the half-axial elements 4 and 5, the differential is blocked and automatically transmits power to the wheel whose engagement with the road is better. The automobile continues moving without skidding.

The chain 9 of balls 8, disposed in the rectangular closed-loop channel 10, according to operating conditions of the differential has to keep minimal clearances between them and between the walls of channel 10. Such chain 9 of balls 8 will have a maximal self-braking owed to the displacement of balls 8 during operation of the device through the right corners 16 of the channel 10.

Figure 3:
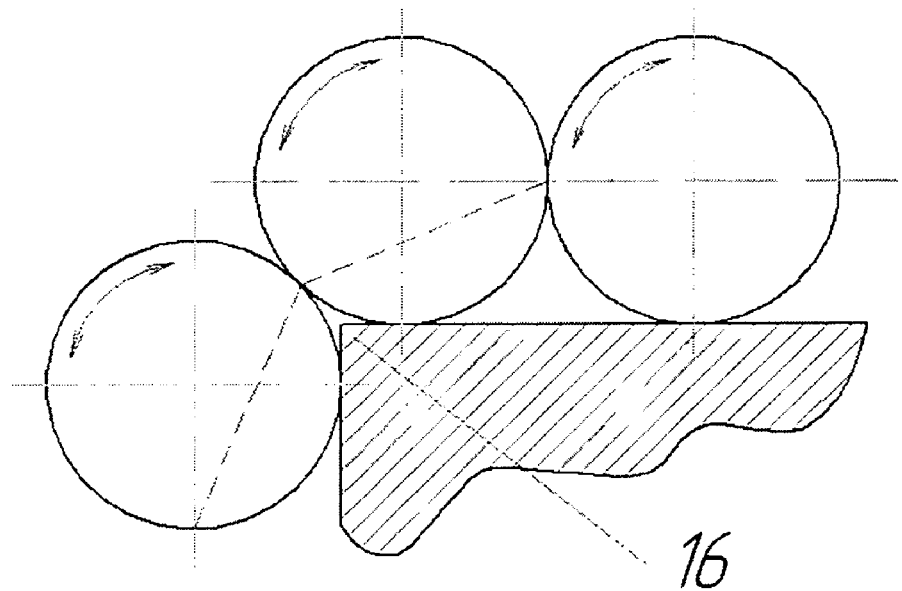
FIG. 3—a fragment of the balls chain wherein the vertex of a corner of the rectangular channel is situated between two adjacent balls.
Figure 4:
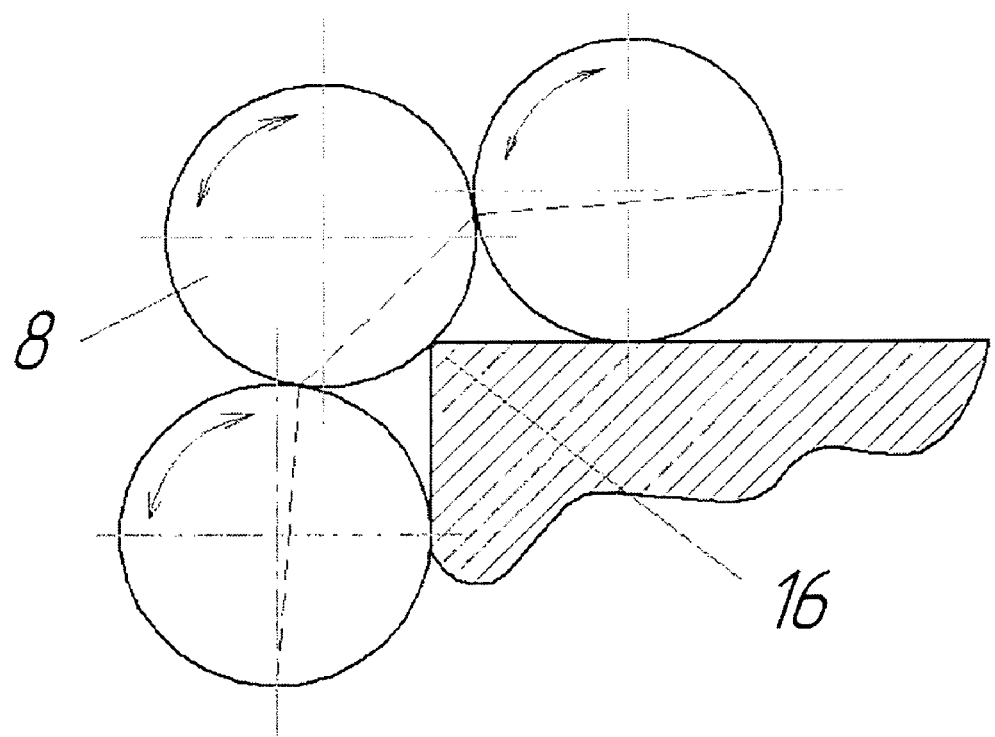
FIG. 4—a fragment of the balls chain wherein one ball is situated at the vertex of a corner of the rectangular channel.

The odd number of balls 8 in the rectangular closed-loop channel 10 provides free movement of the chain of balls 8 with an unchanging minimal clearance between the balls 8. The movement of balls 8 in the rectangular channel 10 leads to a cyclical alteration of the length of a portion of the closed-loop chain 9. When one of the balls 8 enters the vertex of corner 16 of the channel 10, the length of the portion of the closed-loop chain 9 of balls 8 starts smoothly reducing, but the other portion of the chain 9 smoothly and synchronously increases, since the vertex of the other corner 16 of the channel 10 occurs at this moment between balls 8. On a fragment of the chain 9 of three balls 8 (FIG. 3 and FIG. 4), it is shown how the lengths of corresponding chords in the points of contact of the balls 8 with each other are changing. A sum of the lengths of chords of balls 8 (shown with dashed lines) on FIG. 3 is greater than the one on FIG. 4 by 12-14%. When the next balls 8 approach the corners of the rectangular channel 10, the cycle will repeat. Therefore, during the movement of the closed-loop chain with an odd number of balls through the corners 16 of the rectangular channel 10, a portion of chain 9, passing through any two corners of the channel 10, will expand, and the other portion of chain 9, passing the other two corners will contract. This occurs synchronously. In this case, the total length of the closed-loop chain, and hence the minimal clearances between the balls 8 will be preserved.

If the number of balls in the rectangular closed-loop channel were even, then not a portion, but the whole chain would expand or contract during the movement simultaneously on all four corners, wedging the balls, or significantly increasing the clearances therebetween. Having such unstable length of the chain, the differential becomes inoperable.

During four years, applicant developed, made, and tested twelve various variants of differentials for variety of automobiles. In the course of stand tests and tests in different climate conditions on the automobiles, all the differentials showed good results.

During forward and backward movements of the transportation means, the device operates flawlessly as a common differential of a classical scheme, not impeding the handling of the transportation means. The passability in out-of-road conditions and the reliability of driving in complicated weather conditions have been improved. The stability of movement of the automobile during severe ice conditions has also been increased, especially on the turns. In the course of tests, the automobiles were driven by drivers of a wide qualification range, from novices to experienced auto-sportsmen. All of them have noticed improved driving qualities of the cars.

The invention claimed is:

1. A self-blocking differential for a transportation means, comprising
   a drive housing,
   half-axial elements associated with half-axes, said half-axial elements disposed in said housing coaxially to each other, the external surfaces of said half-axial elements provided with helical grooves of opposite spiral directions;
   at least one closed-loop channel disposed in said housing, said at least one channel has an active branch and a reverse branch joined by two straight-line branches at a right angle, said active, reverse and two straight-line branches have a cross-section; and
   an odd number of rolling members in the form of balls filling said channel in a chain manner, said balls each has a predetermined diameter fitting into the cross-section of said branches, a portion of said channel is made open for insertion of segments of the balls into the helical grooves;
   wherein the improvement is characterized in that said channel has a rectangular longitudinal cross-section with rounded external corners and with right angle internal corners.

\* \* \* \* \*